March 7, 1944.  E. J. POITRAS ET AL  2,343,386
TRANSMISSION SYSTEM
Filed Nov. 14, 1935  2 Sheets-Sheet 1

INVENTORS
Edward J. Poitras
James D. Tear
BY
THEIR ATTORNEY

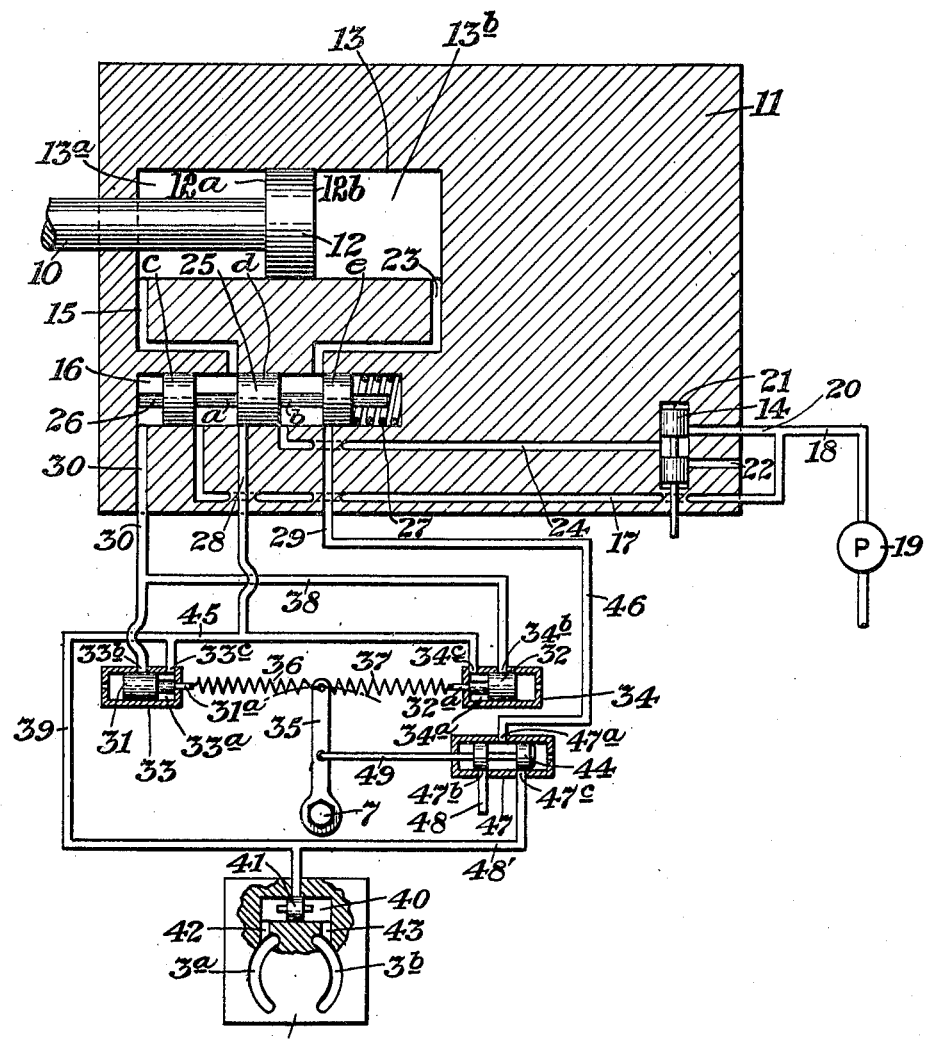

Patented Mar. 7, 1944

2,343,386

UNITED STATES PATENT OFFICE 2,343,386

TRANSMISSION SYSTEM

Edward J. Poitras, Jackson Heights, and James D. Tear, Great Neck, N. Y., assignors to Ford Instrument Company, Inc., Long Island City, N. Y., a corporation of New York Application November 14, 1935, Serial No. 49,694

3 Claims. (Cl. 103—38)

The invention herein disclosed relates to a variable velocity transmission system and in particular to a hydraulic transmission system that includes a motor and a variable displacement pump.

Commonly, such transmissions are utilized for controlling the velocity of a driven object. As heretofore constructed, safety valves have been used to prevent overloading of the system or the prime mover operating through the transmission. When an abnormal load is placed upon such a transmission system, the pressure of the oil delivered by the pump increases to take care of the load. In order for safety valves to be effective in protecting the prime mover it is necessary to have the safety valves open at a pressure such that when the transmission is operating at its maximum velocity, that is, the maximum volumetric displacement, the prime mover will not become overloaded. This arrangement has the disadvantage that when the transmission is operating at a low velocity or intermediate velocities, it cannot exert its maximum power since the safety valves open at a pressure below that at which the maximum power is exerted for these lower velocities, and it is an object of this invention to provide a transmission system which upon being subject to an abnormal load will exert such effort as is necessary to take care of the abnormal load up to the maximum effort of which it is capable without overloading the prime mover.

In accordance with the invention there is provided in conjunction with a hydraulic transmission including a hydraulic motor and a variable displacement pump, controls which are effective to vary the displacement of the pump in accordance with the pressure of the hydraulic medium delivered by the pump. The reaction torque on the prime mover operating through the transmission is dependent upon the displacement of the pump and the pressure of the hydraulic medium delivered by the pump. The limiting pressure of the hydraulic medium thus varies with the displacement, the permissible pressure being greater the lower the displacement. The controls provided by this invention operate to decrease the displacement as the pressure exceeds the permissible limit for the particular displacement at which the transmission is operating and continue to decrease the displacement as the pressure rises until the effort of the transmission system is within the allowable limit.

A transmission so constructed is disclosed in the accompanying drawings in which:

Fig. 2 is a diagrammatic illustration of certain of the parts and the hydraulic interconnection thereof; and Fig. 3 is a diagrammatic illustration of a modified form of part of the transmission.

Figure 1:
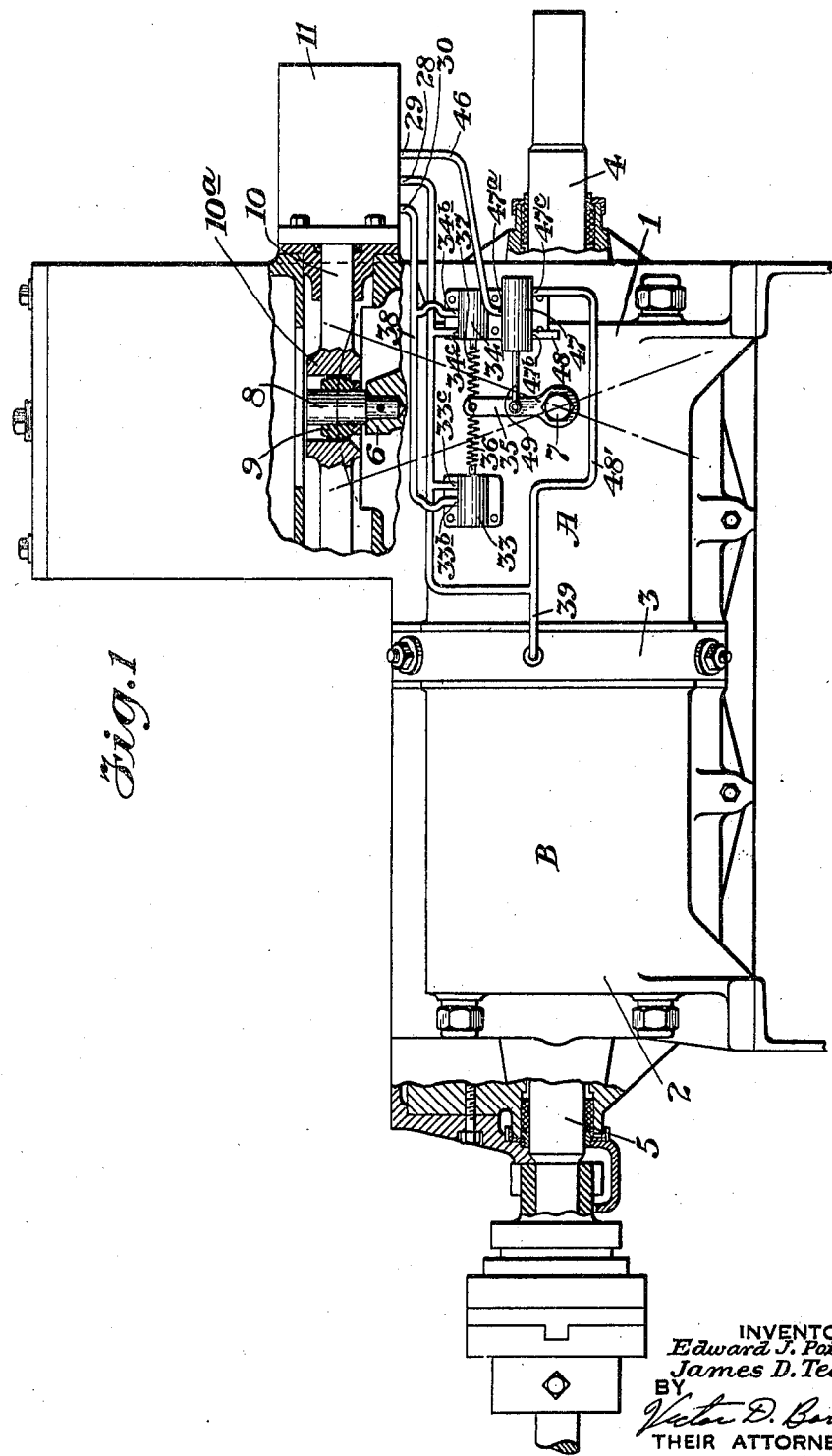
Fig. 1 is a side elevation of the transmission.

The transmission illustrated in the drawings is of a well known type. It includes a pump 1 known as the "A" end and a hydraulic motor 2 known as the "B" end with a stationary valve plate 3 intermediate the "A" and "B" ends and controlling communication between the cylinders of the pump and motor. Except for one feature, the pump and motor are identical in construction. Each consists of a rotatably mounted cylinder block having several cylinders extending parallel to the longitudinal axis of the transmission and arranged in a circle about the block. The ends of the cylinder blocks abut against the valve plate through which oil is transferred from the cylinders of the pump to the cylinders of the motor and conversely in proper sequence. In the pump rotational movement of the cylinder block which is fixed to the shaft 4 is converted into reciprocating motion of the pistons in the cylinders, and in the motor the reciprocating motion of the pistons is converted into rotary motion of the motor shaft 5, by inclined plates or boxes, inclined to the axis of the shaft. The inclination of the plate of the motor is commonly fixed but the inclination of the plate, or tilting box as it is commonly called, in the pump is variable to vary the displacement of the pump per revolution and the direction of flow of oil delivered by the pump. It is in this manner that the velocity of the motor is controlled. A transmission, or hydraulic gear as it is commonly called, of this type is illustrated and described in the United States Letters Patent No. 925,148, granted June 15, 1909, to H. D. Williams.

In the transmission illustrated in the accompanying drawings, the tilting box 6 of the pump is shown as pivotally mounted on trunnions 7 about an axis at right angles to the paper. Into a bore in the upper end of the tilting box there is fitted one end of a pin 8 which is secured to the tilting box and through which the tilting box is moved about the trunnions. On the pin 8, there is mounted a collar 9 having a toric surface and this collar is received in a fitting 10a formed on a piston rod 10. The toric surface of the collar 9 permits oscillation of the pin 8 within the circular opening of the fitting 10a upon reciprocating movement of the piston rod 10.

The piston rod 10 extends into a control unit 11 and has formed on the end thereof a piston 12 which is reciprocally mounted in a cylindrical compartment 13 formed in the control unit. The piston is thus directly connected to the tilting box and the tilting box is moved from its neutral position, perpendicular to the axis of the hydraulic gear, in accordance with the movements of the piston.

Fluid under pressure is admitted to and exhausted from the cylinder compartment containing the piston to control movement of the piston by a valve 14. The piston 12 is of the differential type in which one face 12a, that having the piston rod connected thereto, is one-half of the area of the opposite face 12b. With this arrangement, the given pressure acting upon the face b creates a force twice as great as the force created by the same pressure acting upon the face 12a of the piston 12. The chamber 13a of which the face 12a of the piston 12 forms an end wall is connected through a passage 15, a compartment formed in a valve chamber 16, and a passage or pipe 17 to a pipe 18 connected to the high pressure side of a pump 19. The pump is capable of furnishing fluid under a high pressure and it is driven from the shaft 4 of the hydraulic gear. The oil delivered by the pump to the pipe 18 is preferably maintained at a constant pressure by a constant pressure valve (not shown). Fluid under a constant pressure is therefore maintained in the chamber 13a of the cylinder 13.

A branch passage 20 connects the high pressure side of the pump to a port in the valve compartment 21 in which the valve 14 is mounted. Another port communicating with the valve compartment 21 is connected by a passage 22 to the exhaust, or to the intake or low pressure side of the pump. The chamber 13b formed in the cylinder compartment 13 and having the piston face 12b as one end of the wall thereof is connected by a passage 23 to another compartment formed in the valve chamber 16 and by a passage 24 to the central compartment of valve chamber 21 which is between the pressure and exhaust ports of the valve chamber. The piston valve 14 is of the usual type having a reduced section at its axial center and when in the off position it laps the pressure and exhaust ports. If however the valve is moved upwardly from the position shown in Figure 2, the pressure port is connected to the passage 24 and fluid under pressure is admitted to the chamber 13b. Since this creates a force on the surface 12b of the piston twice as great as the force acting on the surface 12a of the piston, the piston will be moved to the left from the position shown in Figure 2. Likewise, when the valve is moved downwardly from the position shown, the exhaust passage 22 is connected to the passage 24 and the pressure in the chamber 13b is reduced, so that the force acting upon the face 12a of the piston causes the piston to move in the opposite direction. With this arrangement movement of the piston is controlled by the single piston valve 14. The piston valve 14 may be operated manually.

In the valve compartment 16, there is a piston valve 25. This valve is for the purpose of shifting the control of the piston 12 from the valve 14 to the controls which operate to decrease the displacement of the hydraulic gear as the pressure exceeds the permissible limit for the particular displacement at which the transmission is operated. The valve includes two reduced portions $a$ and $b$ and three sections $c$, $d$ and $e$ which are provided for the purpose of controlling communication between the ports. During the normal operation of the hydraulic gear, the valve is held in the position illustrated in Figure 2 in which position an abutment pin 26 abuts against the left-hand end of the valve compartment. The valve is maintained in this position by a spring 27 acting between the opposite end of the valve and the end of the valve compartment. In this position of the valve, the passages 15 and 17 are in communication through the chamber formed by the reduced section $a$ of the valve and the passages 23 and 24 are in communication through the reduced section $b$ of the valve so that the operation of the piston 12 is under the control of the valve 14.

When the pressure in the "A" end of the hydraulic gear exceeds the permissible pressure for the particular displacement at which the hydraulic gear is operating, the valve 25 is shifted to the right from the position shown in Figure 2 and the section $c$ of the valve laps the port through which the passage 17 communicates with the valve chamber and the section $d$ of the valve laps the port through which the passage 24 communicates with the valve chamber. The passages 15 and 23 remain open however and these passages are connected to passages 28 and 29 respectively, the ports through which these passages communicate with the valve chamber being lapped by the sections $d$ and $e$ of the valve when the valve is in the normal operating position. The valve is shifted to effect this change in connection by oil entering the valve chamber through a passage 30 which is connected to the valve chamber at that section in which a compartment is formed by the abutment pin 26.

The operation of the valve 25 when the pressure in the transmission exceeds the permissible limit for the particular displacement is effected through control valves 31 and 32. The valves 31 and 32 are piston valves and they are reciprocally mounted in valve casings 33 and 34 respectively. The valve casings are secured to the side of the "A" end of the hydraulic transmission, one on each side of an arm 35 secured to one of the trunnions 7 for oscillation with the trunnion. A spring 36 is secured at one end to the arm 35 and at the other end to the valve stem 31a of the valve 31; a similar spring 37 is connected between the arm 35 and the valve stem 32a of the valve 32.

The valve 31 controls communication between ports 33b and 33c in the valve casing 33 and the valve 32 controls communication between similar ports 34b and 34c in the valve casing 34. The ports 33b and 34b are connected together and to the passage 30 in the control block 11 by a pipe 38. The springs 36 and 37 act to hold the valves 31 and 32 in one extreme position of their movements, the position in which the ports, 33b and 34b, controlled thereby are lapped.

The greater of the pressures in the ports 3a and 3b of the valve plate 3 acts in opposition to the action of the springs 36 and 37. This effect is secured by connecting the ports 33c and 34c, which communicate with chambers formed between the ends of the valves 31 and 32 having the valve stems extending therefrom and the adjacent ends of the valve casings, by a pipe 39 to a port in a valve chamber 40 formed in the valve plate 3. In the valve chamber 40, there is a shuttle valve 41 which controls communication between the port to which the pipe 39 is connected and ports 42 and 43 connected respectively to the ports 3a and 3b of the valve plate 3. When the "A" end of the hydraulic gear is operating, the oil in the port 3a or 3b, whichever is under the higher pressure, moves the valve 41 to open communication between the high pressure port and the port to which the pipe 39 is connected. Thus, the high pressure oil of the "A" end of the hydraulic gear acts on the valves 31 and 32 in opposition to the force of the springs 36 and 37.

The valves 31 and 32 have their ports connected in parallel, and when the tilting box 6 is displaced to the left from the position illustrated in Figure 1, the pull of the spring 36 on the valve 31 is less than the pull of the spring 37 on the valve 32, and the valve 31 is effective. Likewise, when the tilting box is moved in the opposite direction, the valve 32 is effective. Normally, the system operates well within the capacity of the prime mover operating through the transmission. For every displacement of the pump, however, there is a limiting pressure beyond which the prime mover becomes overloaded. As previously stated these limiting pressures decrease the greater the displacement and conversely the limiting pressures increase the lower the displacement.

The displacement of the arm 35, and consequently the ends of the springs 36 and 37, is proportional to the volumetric displacement of the pump or "A" end of the hydraulic transmission. The pull of these springs on the valves to which they are connected thus varies linearly with the displacement of the "A" end of the transmission. The springs 36 and 37 are so chosen with reference to the area of the surface of the valves on which the oil pressure acts as to place the ports controlled thereby into communication when the pump reaches the limiting pressure for any particular displacement, and the products of the displacements of the "A" end of the transmission and the limiting pressures are, for all practical purposes, maintained equal to a constant value by the valves 31 and 32.

If it be assumed that the piston 12 has been moved a definite amount from its neutral position by means of the control valve 14, the "B" end of the hydraulic gear will operate at a constant velocity. If while so operating, a temporary load, either of a retarding or overhauling nature, is placed thereon such that it requires the maximum effort of the transmission to overcome the load, the following will occur: The pressure of the oil delivered by the pump will increase. As this pressure reaches the limiting value for the particular position of the tilting box, either valve 31 or 32 will be moved from the position shown in Figure 2 to open either port 33b or 34b, thereby placing passages 45 and 30 in communication. Oil under pressure will, therefore, be admitted to the valve chamber 16 through the passage 30 and move the valve 25 to the right from the position shown, closing the passages 17 and 24 and opening the passages 28 and 29. The passages 28 and 29 are thus placed into communication with the passages 15 and 23 and the piston 12 is then actuated by oil delivered from the "A" end of the hydraulic gear and the direction of flow of oil in the chamber 13b is controlled by a directional valve 44.

The passage 28 is connected by a pipe 45 to the pipe 39 and so to the higher of the pressures in the valve plate. The chamber 13a is thus upon the movement of the valve 25 connected to the high pressure port of the valve plate 3. The passage 29 is connected by a pipe 46 to a port 47a in the valve casing 47 in which the piston valve 44 is mounted and the piston valve controls communication between the port 47a and ports 47b and 47c. The port 47b is connected to exhaust by a pipe 48 and the port 47c is connected to the pressure pipe 39 by a pipe 48'. The position of valve 44, therefore, determines whether pressure or exhaust will be supplied to port 47a.

The valve casing 47 is secured to the "A" end of the hydraulic gear and the valve 44 is connected to the arm 35 by a rod 49. When the tilting box moves to the left, the valve 44 is positioned to place the ports 47a and 47b in communication, that is, the chamber 13b is connected to the exhaust. Consequently, the piston 12 will move to the right, decreasing the tilt of the tilting box. This movement will continue until the pressure in the chamber 33a of the valve compartment is less than enough to overcome the force exerted by the spring 36. When this condition exists, that is, when the pressure in the transmission is at the limiting pressure for the tilt of the tilting box or when the tilt has been reduced sufficiently to overcome the load, the valve 31 closes, the valve 25 is returned to the position illustrated and the valve 14 again controls the action of the piston 12.

When the tilting box of the hydraulic gear is moved to the right from the position shown in Figure 1, the valve 44 is moved to the right and opens communication between the ports 47a and 47c so that in the event that the pressure in the transmission actuates the valve 32 and thus shifts the valve 25, the chamber 13b will be connected to the high pressure passage 48' and the piston 12 will be moved to the left to decrease the tilt of the tilting box of the hydraulic gear. This directional characteristic of the valve 44 thus causes the angle of tilt of the tilting box to be decreased whether the excessive effort be due to a resistive load or an overhauling load, such as might be caused by the momentum of a heavy load.

The valves 31 and 32 are made so that when in the position illustrated, oil in the line 38 and the passage 30 may leak past the valve so that it will not be trapped in the valve chamber 16 and thus prevent the valve 25 from moving under the action of the spring 27.

In Figure 3 of the drawings, there is disclosed, diagrammatically, an arrangement in which a single valve 31' performs the functions of the valves 31 and 32 illustrated in Fig. 2. The valve 31' is similar in all respects to the valve 31; it is slidably mounted in a valve case 33' and has a stem 31a' extending through the end of the case; it controls communication between ports 33b' and 33c' in the valve case which ports may be connected to the pipes 30 and 45 as disclosed in Figure 2.

A cam plate 50 secured to the trunnion 7 of the tilting box of the hydraulic gear for movement therewith serves to decrease the spring pressure on the valve 31' upon movement of the tilting box off its neutral position. The stem 31a' of the valve 31' is connected to one end of a spring 51 which at its other end is connected to a rod 52 that carries a cam follower 53 which cooperates with the cam surface of the cam 50. The cam surface 50a of the cam 50 has two diverging slopes and in the neutral position of the tilting box the cam follower rests on the apex of the cam surface. The cam follower is constrained to movement axially of the spring 51 and rod 52 by guides 54 and 55. In this modification, the valve rod 49 is secured to the cam plate for actuation of the valve 44 in a manner similar to its actuation in the arrangement shown in Figure 2.

In operation, the valve 44 functions in the same manner with the arrangement disclosed in Figure 3 as it does in the arrangement illustrated in Figure 2; it is shifted in its valve case upon movement of the tilting box through its connection to the cam plate 50. When the cam plate 50 is moved by the tilting box, regardless of the direction, the cam follower rides along one of the sloping surfaces of the cam surface and the force with which the spring 51 acts on the valve 31' is decreased in proportion to the movement of the cam plate from its neutral position, i. e. the position in which it is illustrated in Figure 3. It will be evident that upon the valve 31' being moved to open communication between the ports 33b' and 33c, the valve 26 will be actuated as heretofore explained in the description of the operation of the arrangement shown in Figure 2. The valve 31' thus serves the same functions as those performed by the valves 31 and 32 in the arrangement shown in Figure 2.

It is obvious that various changes may be made by those skilled in the art in the details of the embodiment of the invention illustrated in the drawings and described above within the principle and scope of the invention as expressed in the appended claims.

We claim:

1. In combination with a variable displacement pump having means for varying the displacement of the pump, means for actuating the displacement varying means and control means therefor including means normally operative for controlling the operation of said actuating means, and additional control means for said actuating means operative to reduce the displacement of the pump including means operative in accordance with the displacement of the pump and the pressure of the hydraulic medium delivered by the pump and means operative by movement of the displacement varying means for selectively determining the direction of movement of said actuating means upon operation of said displacement and pressure operative means, and means for rendering said normally operative control means ineffective and said additional control means effective upon operation of said pressure and displacement operative means.

2. In combination with a variable displacement pump having means for varying the displacement of the pump, hydraulically operated means for actuating the displacement varying means and control means therefor including a valve normally operative for controlling the operation of said actuating means, and additional control means for said actuating means operative to reduce the displacement of the pump including a hydraulically operated valve, connections for effecting the operation of the valve in accordance with the displacement of the pump and the pressure of the hydraulic medium delivered by the pump and a valve operative by movement of the displacement varying means for selectively determining the direction of movement of said actuating means upon operation of said displacement and pressure operative valve, and means for rendering said normally operative control valve ineffective and said additional control means effective upon operation of said pressure and displacement operative means.

3. In combination with a variable displacement pump having means for varying the displacement of the pump, hydraulically operated means for actuating the displacement varying means and control means therefor including a valve normally operative for controlling the operation of said actuating means, and additional control means for said actuating means operative to reduce the displacement of the pump including a hydraulically operated valve, connections for effecting the operation of the valve in accordance with the displacement of the pump and the pressure of the hydraulic medium delivered by the pump and a valve operative by movement of the displacement varying means for selectively determining the direction of movement of said actuating means upon operation of said displacement and pressure operative valve, and means for rendering said normally operative control valve ineffective and said additional control means effective upon operation of said pressure and displacement operative means comprising a valve, resilient means acting on one end of the valve and connections for admitting a hydraulic medium to act upon the other end of the valve.

EDWARD J. POITRAS.
JAMES D. TEAR.